United States Patent [19]

Nussdorfer

[11] Patent Number: 5,998,571
[45] Date of Patent: Dec. 7, 1999

[54] METHOD FOR MANUFACTURING SHAPED PARTS BY POLYMERIZATION OF LACTAMS IN MOLDS

[75] Inventor: Bernd Nussdorfer, Geldern/Walbeck, Germany

[73] Assignee: G. Schwartz GmbH & Co. KG, Xanten, Germany

[21] Appl. No.: 08/999,887

[22] Filed: Jul. 27, 1998

Related U.S. Application Data

[63] Continuation-in-part of application No. 08/718,429, filed as application No. PCT/EP96/00094, Jan. 11, 1996, abandoned.

[30] Foreign Application Priority Data

Jan. 20, 1995 [DE] Germany .............................. 195 01 646

[51] Int. Cl.$^6$ ...................................................... C08G 69/08
[52] U.S. Cl. ........................... 528/315; 264/239; 528/312; 528/314; 528/317; 528/323
[58] Field of Search ...................................... 528/312, 314, 528/315, 317, 323; 264/239

[56] References Cited

U.S. PATENT DOCUMENTS 4,611,034  9/1986  Meyer et al. ............................ 525/420

*Primary Examiner*—John M. Cooney, Jr.
*Attorney, Agent, or Firm*—Robert W. Becker & Associates

[57] ABSTRACT

A method for manufacturing shaped parts by polymerization of lactams in a mold includes the steps of providing a melt consisting of at least one catalyst, at least one activator, and amino-terminated polyethers in a mold and providing as the catalyst a 17% by weight solution of sodium lactamate in an amount of 1.0 weight-% to 3.8 weight-%.

10 Claims, No Drawings

METHOD FOR MANUFACTURING SHAPED PARTS BY POLYMERIZATION OF LACTAMS IN MOLDS

This application is a Continuation-In-Part of application Ser. No. 08/718,429, filed Dec. 20, 1996 which is now abandoned, based on PCT/EP96/00094 with International Filing Date of Jan. 11, 1996.

BACKGROUND OF THE INVENTION

The present invention relates to a method for manufacturing shaped parts by polymerization of lactams in molds whereby the melt comprises at least one catalyst, at least one activator, and amino-terminated polyethers. The invention also relates to novel shaped parts manufactured according to the inventive method.

The technical manufacture of shaped parts from lactams, preferably by activated alkaline fast polymerization or block polymerization, has been in use for approximately 30 years. The term "shaped parts" in the context of the present invention refers to elements produced by known molding and polymerization techniques, including semi-finished products, shaped elements, tubes, plates, etc.

Shaped parts of lactams are produced by polymerization of lactams in casting molds and, in comparison to conventional plastic elements, for example, made of polyamide, they are, in general, harder, stiffer, and more wear-resistant. This is, in principle, due to their higher crystallinity. By determining the method-related parameters such as temperature, residence time etc. as well as by selecting the additives to be used and the post-treatment steps, the respective technological properties of the shaped parts can be influenced. Most of the aforementioned parameters, however, can only be realized with great economical and technical expenditure. The high crystallinity furthermore has the effect that the shaped parts made of lactams also have high brittleness.

Especially at low temperatures polyamides, in general, have a tendency to brittleness-related breakage, and they are also notch-sensitive. This is especially true for polyamides produced by activated anionic polymerization of lactams. This technological weakness impedes the use of shaped parts of polyamide in cold areas or in areas with great temperature fluctuations. This is especially true for rollers, gear wheels, and support elements. It is known from European Patent Application 0 167 908 to improve the impact strength of the polyamides at low temperatures by using in their manufacture amino-terminated polyethers. This resulted in good impact resistance and notch impact resistance at temperatures of 0 to 40° C. by formation of polyamide block copolymers. The aforementioned European Patent Application 0 167 908 discloses a number of formulations which, however, are insufficient for the manufacture of high impact resistant shaped parts by polymerization of lactams in molds for the use in areas with temperatures below −40° C. or in areas with great temperature fluctuations, also within the positive temperature range. Especially, the prior art does not provide any indication insofar as how the so-called technological properties at low temperatures can be affected, respectively, reached.

Based on this, the present invention has the object to improve a method for manufacturing shaped parts by polymerization of lactams in a mold of the aforementioned kind such that shaped parts are obtained that are useful for employment within wide temperature ranges and have, in general, good technological properties.

SUMMARY OF THE INVENTION

As a technical solution to this object it is suggested with the invention to use as a catalyst 1 to 3.8 weight-% of a solution containing 17% by weight sodium lactamate in a suitable solvent.

The inventive method is thus characterized by the steps of:
providing a melt comprising at least one catalyst, at least one activator, and amino-terminated polyethers in a mold; and
providing a 17% by weight solution of sodium lactamate in an amount of 1.0 weight-% to 3.8 weight-% as the at least one catalyst. Preferably, the amount of catalyst solution is 2.5 weight-% to 3.8 weight-%.

The amino-terminated polyethers are preferably present in the melt in an amount of 10 weight-% to 26 weight-%.

The at least one activator is advantageously present in the melt in an amount of 2 weight-% to 4 weight-%.

In a further embodiment of the invention, the method comprises the step of adjusting the temperature of the melt to 90° C. to 160° C., preferably to 100° C. to 110° C.

In another embodiment the method comprises the step of heating the mold to a temperature of 120° C. to 200° C., preferably of 145° C. to 190° C.

The method may also comprises the step of adding a crystallization additive in an amount of 1% to the melt.

The invention also relates to a shaped part produced in accordance with the method of the present invention.

The melt resulting according to the invention comprises conventional activators in conventional amounts, amino-terminated polyethers and sodium lactamate in the disclosed amounts. The shaped parts produced according to the disclosed method, for example, support plates for mobile cranes, have very good technological properties which are maintained in temperature ranges of −50° C. to +80° C., including high tensile strength, modulus of elasticity, sufficient stiffness, and high compression strength. Even at surface pressures of approximately 65 N/mm² the shaped part can still be loaded with high bending moments.

It is suggested advantageously that the 17 weight-% solution of sodium lactamate is preferably used in amounts of 2.5 to 3.8 weight-%, more preferred 2.9 to 3.8 weight-%.

The amino-terminated polyethers are preferably used in amounts of 10 to 26 weight-%. The activator, conventionally polyisocyanate, is preferably used in amounts of 2 to 4 weight-%.

The disclosed ranges allow formulations for the polymerization melt with which shaped parts of the desired technological properties can be obtained.

It is suggested advantageously that the temperature of the melt be adjusted to 90° C. to 160° C., preferably 100° C. to 110° C. Furthermore, it is advantageously suggested that the temperature of the mold be adjusted to 120° C. to 200° C., preferably 145° C. to 190° C.

Advantageously, it is possible to add furthermore a crystallization accelerator, preferably in an amount of 1 weight-%. Such an additive can function as a nucleation seed during polymerization and thus may provide a special contribution to improvement of the low temperature properties of a polyamide part.

The inventive method allows the manufacture of shaped parts by polymerization of lactams in molds which, even at low temperatures, have a high impact resistance and a high notch resistance. In addition, the conventional good technological properties of polyamide are retained.

DESCRIPTION OF PREFERRED EMBODIMENTS

Respective shaped parts can be obtained by the exemplary use of the inventive method. In all of the following examples, the catalyst is inventively in the form of a solution containing 17% by weight sodium lactamate and the given amount refers to the amount of solution used. All percentage values refer to weight-%.

The following values were used for the manufacture of furnace parts:

EXAMPLE 1

Catalyst solution: 2.9%
Activator: 2.5%
Amino-terminated polyether: 10%
Crystallization accelerator: 1.0%
Melting temperature: 100–105° C.
Mold temperature: 175–180° C.

EXAMPLE 2

Catalyst solution: 3.5%
Activator: 3.0%
Amino-terminated Polyether: 15%
Crystallization accelerator: 1.0%
Melting temperature: 103–106° C.
Mold temperature: 180–185° C.

EXAMPLE 3

Catalyst solution: 3.5%
Activator: 3.0%
Amino-terminated Polyether: 17.5%
Crystallization accelerator: 1.0%
Melting temperature: 106–110° C.
Mold temperature: 180–188° C.

The following values were adjusted for the manufacture of support legs whereby either a rising cast process or pivoting molds were used.

EXAMPLE 4

Catalyst solution: 3.8%
Activator: 3.5%
Amino-terminated Polyether: 26%
Crystallization accelerator: 1.0%
Melting temperature: 104–106° C.
Mold temperature: 152–155° C.

EXAMPLE 5

Catalyst solution: 3.5%
Activator: 3.0%
Amino-terminated polyether: 17.5%
Crystallization accelerator: 1.0%
Melting temperature: 101–103° C.
Mold temperature: 145–155° C.

For the manufacture of centrifugal tubes the following values were adjusted.

EXAMPLE 6

Catalyst solution: 3.8%
Activator: 3.5%
Amino-terminated polyether: 20%
Crystallization accelerator: 1.0%
Melt temperature: 103–108° C.
Mold temperature: 180–190° C.

Especially excellent values result from use of amino terminated polyether in an amount of 26 weight-%.

With a subsequent post-tempering step of the part at temperatures above 120° C., which is performed directly after removal of the shaped parts from the molds, the required crystallinity is achieved.

The present invention is, of course, in no way restricted to the specific disclosure of the specification and drawings, but also encompasses any modifications within the scope of the appended claims.

What I claim is:

1. A method for manufacturing shaped parts by polymerization of lactams in a mold; said method comprising the steps of:
    providing a melt comprising at least one catalyst, at least one activator, and amino-terminated polyethers in a mold; and
    providing a 17% by weight solution of sodium lactamate as the at least one catalyst in an amount of 1.0 weight-% to 3.8 weight-%.

2. A method according to claim 1, wherein said amount is 2.5 weight-% to 3.8 weight-%.

3. A method according to claim 1, further comprising the step of selecting the amino-terminated polyethers in the melt to be 10 weight-% to 26 weight-%.

4. A method according to claim 1, further comprising the step of selecting the at least one activator in the melt to be 2 weight-% to 4 weight-%.

5. A method according to claim 1, further comprising the step of adjusting the temperature of the melt to 90° C. to 160° C.

6. A method according to claim 1, wherein the temperature of the melt is adjusted to 100° C. to 110° C.

7. A method according to claim 1, further comprising the step of heating the mold to a temperature of 120° C. to 200° C.

8. A method according to claim 7, wherein the mold is heated to a temperature of 145° C. to 190° C.

9. A method according to claim 1, further comprising the step of adding a crystallization additive in an amount of 1% to the melt.

10. A shaped part produced in accordance with the method of claim 1.

* * * * *